US012647187B2

(12) United States Patent
Williams

(10) Patent No.: US 12,647,187 B2
(45) Date of Patent: Jun. 2, 2026

(54) HIGH SPEED REMOVAL OF BIAS OF A HOMODYNE DETECTOR USING A CLONE LOCAL OSCILLATOR

(71) Applicant: UT-Battelle, LLC, Oak Ridge, TN (US)

(72) Inventor: Brian P. Williams, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 196 days.

(21) Appl. No.: 18/437,706

(22) Filed: Feb. 9, 2024

(65) Prior Publication Data

US 2024/0275493 A1 Aug. 15, 2024

Related U.S. Application Data

(60) Provisional application No. 63/444,435, filed on Feb. 9, 2023.

(51) Int. Cl.
*H04B 10/70* (2013.01)
*H04B 10/63* (2013.01)
*H04L 9/08* (2006.01)

(52) U.S. Cl.
CPC ............. *H04B 10/63* (2013.01); *H04B 10/70* (2013.01); *H04L 9/0852* (2013.01)

(58) Field of Classification Search
CPC ................................ H04B 10/63; H04B 10/70
See application file for complete search history.

(56) References Cited

U.S. PATENT DOCUMENTS

| | | | | |
|---|---|---|---|---|
| 11,451,308 B1* | 9/2022 | Bucklew | ............... | H04B 10/60 |
| 2006/0239463 A1* | 10/2006 | Young | .................. | H04B 10/70 |
| | | | | 380/263 |
| 2017/0237505 A1* | 8/2017 | Lucamarini | ........... | H04L 9/0858 |
| | | | | 398/185 |

(Continued)

OTHER PUBLICATIONS

Lodewyck, J. et al., "Quantum key distribution over 25 km with an all-fiber continuous-variable system", Physical Review Applied 76, 2007, 042305-1 to 042305-10.

(Continued)

*Primary Examiner* — Nathan M Cors
(74) *Attorney, Agent, or Firm* — Scully, Scott, Murphy & Presser, P.C.

(57) ABSTRACT

A receiver configured to remove a bias of a homodyne detector is provided. The receiver produces at least one clone local oscillator (LO) pulse per LO pulse for the reference pulse and per LO pulse for the data-carrying pulse. Measurement made using clone LO pulses are used to compensate for the bias in reference measurements and data-carrying measurements. Clone LO pulses are produced when the reference pulses and the data-carrying pulses are not expected to be present at the homodyne detector. The bias corrected reference measurements may be used as feedback to maintain a timing synchronization of the LO for the reference pulse and the LO for the data-carrying pulse with the corresponding reference pulse and the data-carrying pulse, respectively and for polarization correction. The receiver may be incorporated into a continuous variable (CV) quantum key distribution (QKD) system.

19 Claims, 10 Drawing Sheets

20

(56)                    References Cited

U.S. PATENT DOCUMENTS

2021/0194682 A1\*   6/2021   Rhee ..................... H04B 10/64

OTHER PUBLICATIONS

Fossier, S. et al., "Improvement of continuous-variable quantum key distribution systems by using optical preamplifiers", Journal of Physics B: Atomic, Molecular and Optical Physics 42, 2009, pp. 1-10.

Leverrier, A. et al., "Finite-size analysis of a continuous-variable quantum key distribution", Physical Review Applied 81, 2010, pp. 062343-1 to 062343-11.

Marie, A. et al., "Self-coherent phase reference sharing for continuous-variable quantum key distribution", Physical Review Applied 95, 2017, pp. 012316-1 to 012316-15.

Qi, B. et al., "Generating the Local Oscillator "Locally" in Continuous-Variable Quantum Key Distribution Based on Coherent Detection", Physical Review X 5, 2015, pp. 041009-1 to 041009-12.

Qi, B. et al., "Noise Analysis of Simultaneous Quantum Key Distribution and Classical Communication Scheme Using a True Local Oscillator", Physical Review Applied 9, 2018, pp. 054008-1 to 054008-10.

Qi, B. et al., "Experimental Passive-State Preparation for Continuous-Variable Quantum Communications", Physical Review Applied 13, 2020, pp. 054065-1 to 054065-11.

\* cited by examiner

1

Transmitter (Alice)
10

Insecure Quantum Communication Channel 14

Classical Communication Channel 12

Receiver (BOB)
20

HIGH SPEED REMOVAL OF BIAS OF A HOMODYNE DETECTOR USING A CLONE LOCAL OSCILLATOR

CROSS-REFERENCE TO RELATED APPLICATIONS

This application claims the benefit of and priority to U.S. Provisional Application Ser. No. 63/444,435 filed on Feb. 9, 2023, the entirety of which are incorporated by reference.

STATEMENT REGARDING FEDERALLY SPONSORED RESEARCH

The United States Government has rights in this invention pursuant to contract no. DE-AC05-000R22725 between the United States Department of Energy and UT-Battelle, LLC.

FIELD OF THE DISCLOSURE

This disclosure relates to quantum communication. More specifically, the disclosure relates to quantum key distribution.

BACKGROUND

Quantum keys allow two parties (such as Alice and Bob) to securely communication using a shared random secure (secret) key, e.g., the quantum key. The quantum key may be used to encrypt and decrypt messages. A quantum key is generated via the quantum key distribution (QKD). QKD can revolutionize cryptography.

There are several known methods for QKD. For example, one QKD protocol is continuous-variable (CV)-QKD which uses coherent detection (optical homodyne detection). Optical homodyne detection (detectors) comprises low-cost photodiodes and can be operated in room-temperature. CV-QKD uses a local oscillator to mix with data and/or a reference signal. The photodiodes are within a homodyne detection module. The module comprises beam splitters and a phase shifter and a pair of homodyne detectors. Each of the pair of homodyne detectors comprises two photodiode (balanced photodiodes). Homodyne detectors can simultaneously measure a pair of conjugate quadratures X and P of the incoming quantum state by maintaining a 90° phase offset between the corresponding signals from local oscillators. In classical electrodynamics, $X^2+P^2$ is proportional to the energy (the photon number) of the input light (Z).

Optimal performance for optical homodyne detection is achieved when the performance of the photodiodes is identical, such as detector efficiency and DC offset, e.g., a value output when no light is incident. Due to real-world deficiencies, optical homodyne detectors have bias, so they are not perfectly matched and have non-zero DC offsets.

This bias leads to incorrect conjugate quadratures X and P (e.g., measurements), which in turn leads to an incorrect determination of Z, which is a function of both X and P. Z is used to correct the polarization. If X and P are correct, the polarization may not be properly corrected. Additionally, since the data signal and the reference signal and the local oscillator signals are pulses, the bias may lead to an incorrect timing synchronization which may result in the local oscillator pulse not mixing with the data signal and/or the reference signal. Since pulses of light are used, it is important to perfectly overlap the LO pulses and the quantum signal pulses at the homodyne detector to realize optimal CV performance.

FIG. 9A illustrates an example of X and P measurement where there is a bias offset. As can be seen, the original in the phase space is not at zero. The origin is shifted in the positive direction in both the x-axis and the p-axis. Given the offset, the Z value dramatically changes as a function of phase as seen in FIG. 9B. The offsets pose a problem in CV-QKD systems, since detection of origin centered X, P is often needed to determine a Z value for a measured signal pulse which may be the basis for timing synchronization and/or polarization correction. For example, FIG. 9B, at different phase, values the Z estimate may indicate 100 photons or 0 photons. Therefore, a Z value cannot be used as a feedback mechanism.

Therefore, there is a need for correcting the bias. Certain known methods to correct the detector bias include more expensive devices and device manipulation that removes the bias to begin with. However, this adds complexity to the system and a potential source for additional noise. Other known methods removing the bias in post-processing. However, post-processing correction is too slow for high-speed applications, such as where feedback using bias corrected values is needed.

If a local oscillator is a continuous-wave (CW), e.g., not pulses, correction may be achieved by subtracting a means value from all measurements. However, if the local oscillator produces pulses, subtract the mean value will not work.

SUMMARY

Accordingly, disclosed is a receiver comprising a local oscillator (LO), a homodyne detector, and processing circuitry. The LO is configured to produce pulses comprising a train of primary pulses synchronized to a train of reference pulses transmitted by a transmitter over a quantum communication channel, and a train of secondary pulses. Each secondary pulse is a clone LO pulse. Each primary pulse may correspond to one or more clone LO pulses. The one or more clone LO pulses are timed to split a duty cycle of the train of primary pulses in an even number of equal time intervals. The homodyne detector is configured to receive the reference pulses from the transmitter over the quantum communication channel, mix each reference pulse with a corresponding primary pulse, and output measurement signals comprising (i) reference measurements acquired with the primary pulses mixed with the references pulses, respectively and (ii) bias measurements acquired with respective one or more clone LO pulses for a primary pulse. The processing circuitry is configured to remove bias from the reference measurements by subtracting from the reference measurements corresponding bias measurements.

In an aspect of the disclosure, the one or more clone LO pulses may be a single clone LO pulse timed to split the duty cycle of the train of primary pulses in halves.

In an aspect of the disclosure, the LO may be further configured to produce a train of tertiary pulses synchronized to a train of data-carrying pulses transmitted by the transmitter over the quantum communication channel and a train of quaternary pulses. Each quaternary pulse is a clone LO pulse. Each tertiary pulse may correspond to one or more clone LO pulses from the train of quaternary pulses. The one or more clone LO pulses are timed to split the duty cycle of the train of tertiary pulses in an even number of equal time intervals. The homodyne detector may be further configured receive the data-carrying pulses transmitted by the transmitter over the quantum communication channel, mix the data-carrying pulses with the tertiary pulses, respectively and output measurement signals comprising (i) data-carrying measurements acquired with the tertiary pulses mixed with the data-carrying pulses, and (ii) bias measurements acquired with respective one or more clone LO pulses for a tertiary pulse. The processing circuitry may be further configured to remove bias from the data-carrying measurements by subtracting from data-carrying measurements the corresponding bias measurements.

In an aspect of the disclosure, the one or more clone LO pulses from the train of quaternary pulses may be a single clone LO pulse timed to split the duty cycle of the train of tertiary pulses in halves.

In an aspect of the disclosure, there may be a fixed delay between a clone LO pulse from the train of secondary pulses and associated clone LO pulse from the train of quaternary pulses. Also, there may be the fixed delay between a pulse in the train of primary pulses and associated pulse in the train of tertiary pulses.

In an aspect of the disclosure, the processing circuitry may be further configured to determine a timing of receiving the train of references pulses transmitted by the transmitter over the quantum communication channel and adjust the timing of the train of primary pulses to maintain synchronization. In response to adjusting the timing of the train of primary pulses, the processing circuitry further adjusts the timing of the train of the secondary pulses to maintain the time split of the duty cycle of the train of primary pulses for the train of the secondary pulses. In an aspect of the disclosure, the adjusting of the timing of the train of secondary pulses also adjusts the timing of the train of quaternary pulses. The processing circuitry may be configured to further adjust the timing of the train of tertiary pulses to maintain synchronization based on the determination of the timing of receiving the train of reference pulses.

In an aspect of the disclosure, the receiver may further comprise a polarization controller. The processing circuitry may be further configured to correct a polarization of the train of reference pulses and the train of data-carrying pulses transmitted by the transmitter over the quantum communication channel using the bias corrected reference measurements.

In an aspect of the disclosure, the LO may comprise a continuous-wave light source, an intensity modulator in optical communication with the continuous-wave light source, a beam splitter configured to separate the pulses of light from the intensity modulator into a first light path and a second light path; and a delay configured to provide a fixed delay between light emitted from the first light path with respect to the light emitted from the second light path. The processing circuitry may be further configured to control the intensity modulator to produce pulses of light from the continuous-wave light source at a target repetition timing.

In an aspect of the disclosure, the first light path produces the train of primary pulses and the train of secondary pulses.

In an aspect of the disclosure, the processing circuitry may be further configured to execute real-time shot noise measurement using a clone LO pulse per each duty cycle. In other aspects, the processing circuitry may be further configured to determine a number of photons in each data-carrying pulse based on the real-time shot noise measurement and a bias corrected data-carrying measurement corresponding to the data-carrying pulse.

In an aspect of the disclosure, each of the received data-carrying pulses may comprise a maximum number of photons in a range of 10-100. However, in other aspects, each of the received data-carrying pulses may comprise fewer than 10 photons. In an aspect of the disclosure, the train of primary pulses is at least an order of magnitude larger than the data-carrying pulses.

In an aspect of the disclosure, the processing circuitry may comprise a field programmable gate array (FPGA). The FPGA may be configured to control an intensity modulator and a polarization control.

In an aspect of the disclosure, the continuous-wave light source in the receiver may be different from a light source used to produce the data-carrying pulses and the reference pulses from the transmitter.

In an aspect of the disclosure, the receiver may be incorporated into a continuous variable (CV) quantum key distribution (QKD) system.

Also disclosed is a continuous variable (CV) quantum key distribution (QKD) system comprising a transmitter (TX), a receiver (RX) and a quantum communication channel. The TX is configured to encode a data signal onto the train of data-carrying pulses, and transmit the train of data-carrying pulses and the train of reference pulses over the quantum communication channel. The receiver may have one or more aspects described above and is configured to receive the train of data-carrying pulses and the train of reference pulses transmitted over the quantum communication channel and recover the data signal using the train of data-carrying pulses without bias correction via any clone LO pulses. The data signal may be recovered in accordance with Continuous Variable Quantum Key Distribution (CV-QKD) protocol. The receiver may transmit a sequence of communications to the TX over a classical communication channel to recover the data signal.

In an aspect of the disclosure, the quantum communication channel and the classical communication channel may be formed in the same fiber cable.

In an aspect of the disclosure, the TX may comprise a bias-free phase-amplitude modulator to encode the data signal.

DETAILED DESCRIPTION

In accordance with aspects of the disclosure, clone pulses are used to correct the bias in the measurements from the homodyne detector without using additional hardware. The use of clone pulses enables real-time bias correction without waiting for any software-based bias correction which is part of a known CV-QKD protocol. The bias corrected measurements may be used as feedback to maintain synchronization in time of pulses from the local oscillator and pulses from the transmitter. The bias corrected measurements may also be used as feedback for polarization correction.

For purposes of the description, a transmitter (TX) 10 may also be referred to as "Alice" and the receiver (RX) 20 may also be referred to as "Bob".

Figure 1:
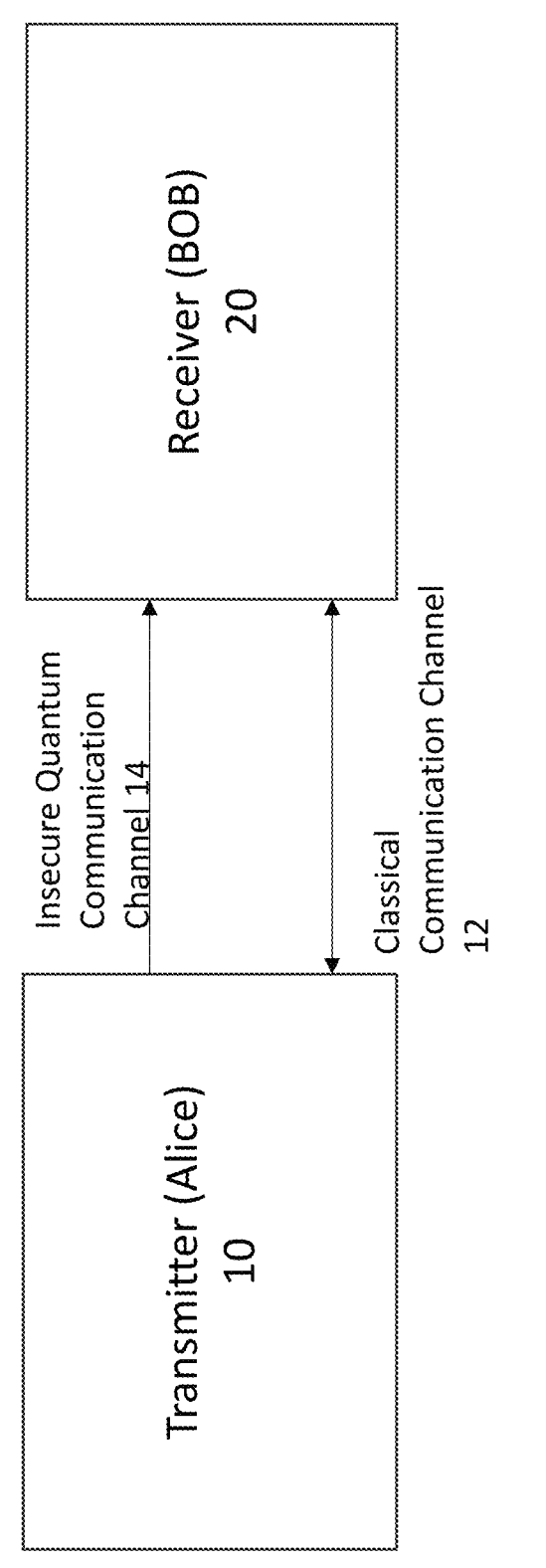
FIG. 1 illustrates an example of a quantum key distribution system in accordance with aspects of the disclosure.

FIG. 1 illustrates an example of a system 1 for distributing a quantum key in accordance with aspects of the disclosure. The system 1 may comprise a TX 10 and a RX 20.

TX 10 and a RX 20 communicate with each other using a classical communication channel 12 and an insecure quantum communication channel 14. The two different channels may be formed from the same medium. For example, the medium may be a fiber optic cable.

In other aspects, the medium may be in free-space. Since the medium may be the same, multiplexing may be used. For example, a wavelength division multiplexing scheme may be employed.

The fiber optic cable may be above-ground or in-ground to avoid environmental factors. The environmental factors may include temperature changes and wind motion.

These factors may impact the quantum key generation rate. The longer the distance between the TX 10 and RX 20, the greater the impact that the environment factors may have on the rate.

When a fiber optic cable is used, the length may be in a range of 1-10 km. In some aspects, the length may be less than 20 km. In some aspects, the length may be less than 1 km. In some aspects, the length may be less than 50 km.

Depending on the distance between TX 10 and RX 20, the patch panel connectors and splices may be used. In some aspects, for longer distances, quantum repeaters may be used.

In other aspects, for longer distances satellites may be used.

The classical communication channel 12 is used to verify a transmitted quantum key (which was transmitted via the insecure quantum communication channel 14). In some aspects, the classical communication channel 12 may be secured in advance of transmission of the quantum key.

The quantum communication channel 14 may be uni-directional (Alice to Bob) whereas the classical communication channel 12 may be bi-directional. Thus, the classical communication channel 12 may be consider two separate channels and therefore, there may be three "channels" of information being send over the same fiber optic cable. Each channel may be a different wavelength.

In other aspects of the disclosure, different fiber optic cables may be used for the insecure quantum communica-tion channel 14 and the classical communication channel 12 to isolate the traffic. While different fiber optic cables may be used, the cables may be bundled.

In other aspects of the disclosure, different types of mediums may be used for the insecure quantum communi-cation channel 14 and the classical communication channel 12.

For example, the classical communication channel 12 may use free-space, whereas the insecure quantum commu-nication channel 14 may use the fiber optic cable or vice versa.

Where different mediums or different fiber optic cables are used, multiplexing may be omitted.

As will be described later, when the TX 10 needs to distribute a quantum key, the TX 10 transmits a sequence of pulses encoded in amplitude and phase to distribution the quantum key to the RX 20 (train of data-carrying pulses 300). This may be done using a bias-free phase-amplitude modulator for encoding the quantum key. Additionally, TX 10 transmits a sequence of reference pulses (train of refer-ence pulses 302). The transmitted reference pulses 302 are used for synchronization, polarization correction (and phase correction). In accordance with aspects of the disclosure, between transmission for distributing the quantum key, the TX 10 transmits the data-carrying pulses 300 and reference pulses 302 to maintain synchronization and polarization correction. In this case, the data-carrying pulses may be encoded in predefined manner, such as 0, $\pi/2$, $\pi$, $3\pi/2$. In order for the RX 20 to see either the reference pulses 302 or the data-carrying pulses 300, local oscillator pulses 222, 224 produced in the RX 20 need to be synchronized for mixing in the homodyne detection module 235.

Figure 2:
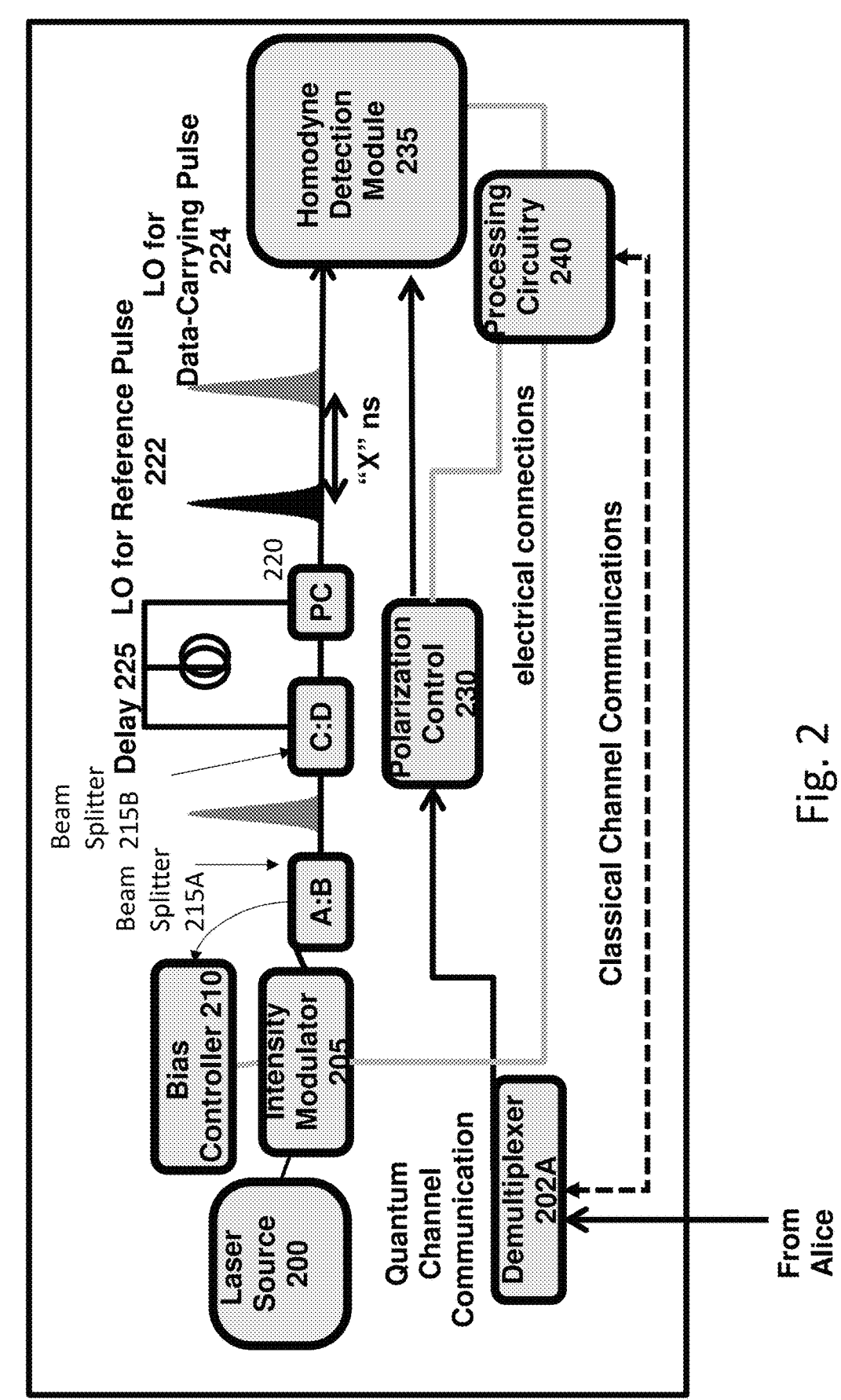
FIG. 2 illustrates an example of a receiver in the quantum key distribution system in accordance with aspects of the disclosure.

FIG. 2 illustrates a diagram of an example RX 20 in accordance with aspects of the disclosure. The RX 20 comprises a laser source 200. The laser source 200 may be a frequency-stabilized continuous wave laser. The laser source 200 emits a light at a target wavelength. In some aspects, the target wavelength may be the same as the laser source (photon source 505) in the TX 10. For example, the wavelength may be about 1540 nm.

Processing circuitry 240 controls an intensity modulator 205 to provide pulse of light having a target pulse width at a target frequency. This target frequency allows for produc-tion local oscillator pulses for the reference pulses 222 and local oscillator pulses for the data-carrying pulses 224 to be in time synchronization with the received reference pulse(s) 302 from the TX 10 and the data-carrying pulses 300 from the TX 10, respectively. The intensity modulator 205 and the processing circuitry 240 are electrically connected. The intensity modulator 205 only allows light to pass when a drive pulse (driving signal) is received from the processing circuitry 240. The intensity modulator 205 may use a Mach-Zehnder interferometer structure. The intensity modu-lator 205 may comprise a LiNbO$_3$ crystal. The processing circuitry 240 supplies the driving signal and a bias controller 210 supplies a bias signal.

In an aspect of the disclosure, the target frequency may initially be an even number multiple of the transmission frequency of the pulses (reference pulses 302 or data-carrying pulse 300) from the TX 10. The use of a multiple is to allow clones pulses 600, 600' to also be produced (in addition to time synchronized pulses). The multiple may be based on the number of clones pulses. For example, if there is a single clone pulse for each of the reference pulses/data carrying pulses, the target frequency may be twice the transmission frequency.

However, due to drift caused by different components in both the TX 10 and the RX 20, the timing of pulses output from the intensity modulator 205 may be shifted by a set step size to maintain time synchronization. The step size may be based on the initial transmission frequency. For example, if the transmission frequency from the TX 10 is 1 MHz, the step size may be 1 ns.

The pulse width of each pulse output by the intensity modulator 205 is set to be the same width as the pulses from the TX 10. In some aspects, the width may be 12 ns in duration.

A fixed-ratio beam splitter 215A is positioned at the output of the intensity modulator 205. This fixed-ratio beam splitter 215A provides a feedback path for the pulses produced by the intensity modulator 205 to the bias controller 210. The feedback path assures that light is only provided by the intensity modulator 205 when desired, e.g., coinciding with the drive signal. An intensity modulator 205 may be temperature sensitive and therefore, even though the processing circuitry 240 may command the intensity modulator 205 to provide pulses at a target time period (with a defined driving signal), some light may be generated outside this period. The bias controller 210 using light feedback from the beam splitter 215A prevents light from being produced outside the target pulse timing and width by issuing a bias signal.

In some aspect of the disclosure, the A:B splitter may be a 99:1 splitter where 1% of the light is feedback into the bias controller 210, whereas 99% passes through.

Each pulse of light produced by the intensity module 205, is used to produce a local oscillator pulse for the reference pulse 222 and a local oscillator pulse for the data-carrying pulse 224. The pulse of light is separated by another beam splitter 215B. The ratio of light may be set by C:D. In an aspect of the disclosure, this ratio may be set not to saturate the photodetectors 310 in the homodyne detection module 235. For example, as shown in FIG. 2, the ratio many be 50:50 where half the light is sent to each light path. However, other ratios may be used. For example, the LO for the data-carrying pulse 224 may have a larger amplitude than the LO for the reference pulse 222.

One of the paths has a delay 225 to create a fixed time offset between the LO for the reference 222 and the LO for the data-carrying pulse 224. The fixed time offset may be set to match the fixed time offset in the reference pulse 302 and the data-carrying pulse 300 from the TX 10. For example, the fixed time offset may be 100 ns. In some aspects of the disclosure, the delay is generated by having a loop in a fiber optic cable on one of the paths. For example, the total added length in the light path caused by the loop may be 20 m achieves a delay of approximately 100 ns.

In an aspect of the disclosure, as shown in FIG. 2, the LO for the reference 222 may be delayed by 100 ns with respect to the LO for the data-carrying pulse 224, e.g., data-carrying pulse is transmitted first. This is to avoid a potential contamination of the LO of data-carrying pulse 224 with photons from the LO for the reference pulse 222.

The timing the LO for the data-carrying pulse 224 and the LO for the reference 222 is intentionally controlled to overlap with the timing of the data-carrying pulse 300 and the reference signal 302, respectively, for mixing in the homodyne detection module 235 (synchronized). In accordance with aspects of the disclosure, the timing of the clone LO 600, 600' is controlled to intentionally not overlap with the timing of the data-carrying pulse 300 and the reference signal 302 to correct for the bias. The measurements when the LO for the data-carrying pulse 224 and the LO for the reference pulse 222 and the data-carrying pulse 300 and the reference pulse 302, respectively, overlap comprise a true measurement and a bias measurement. To obtain a bias corrected measurement (only the true measurement), the bias needs to be removed. To remove the bias, measurements can be taken where there is no data-carrying pulse 300 and the reference pulse 302. Since there are no data-carrying pulse 300 and the reference pulse 302, the measurements at this time will only contain bias.

Figure 6:
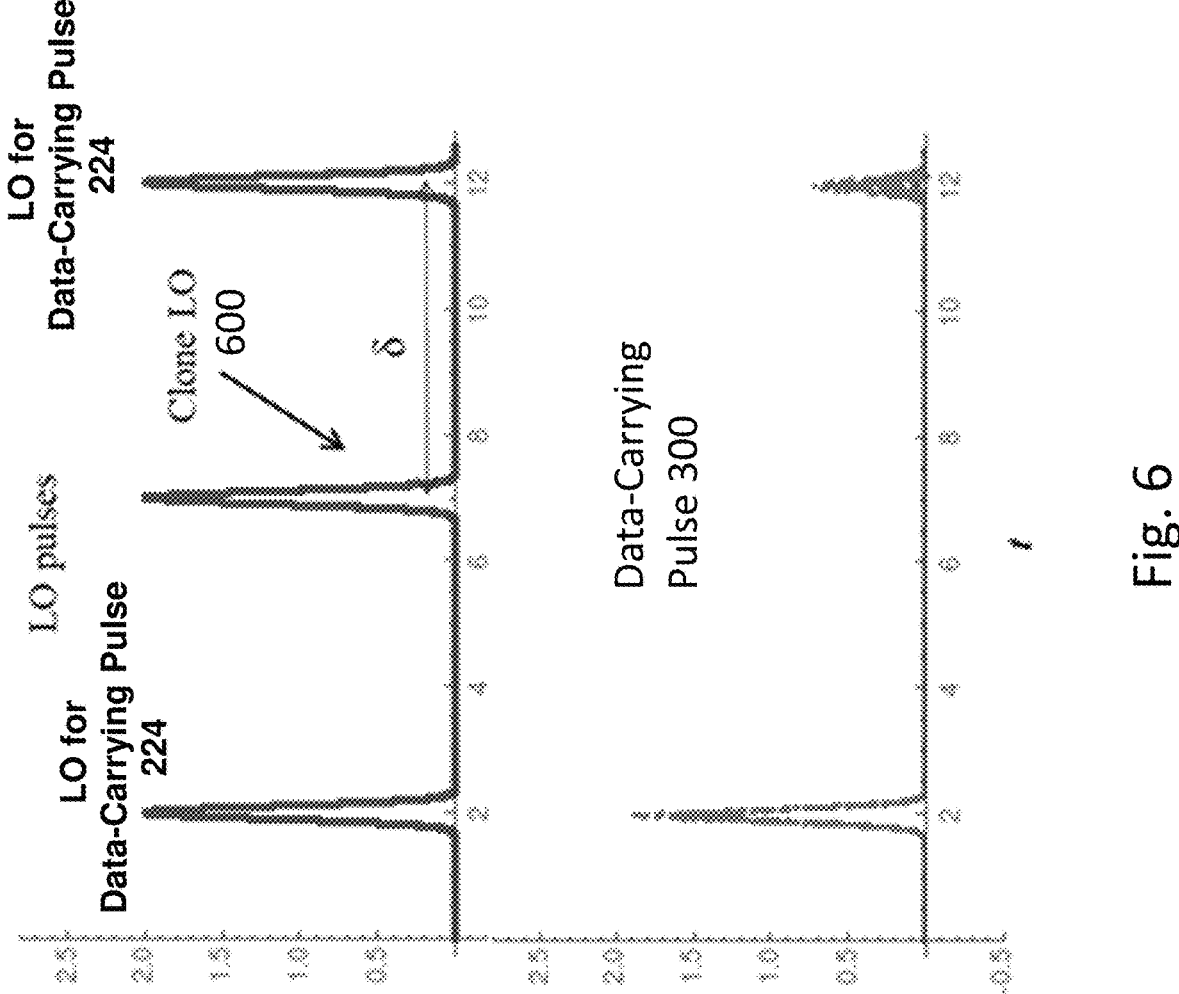
FIG. 6 illustrates an example of local oscillator pulses which correspond to transmitted data signal pulses from the transmitter and a clone pulse in accordance with aspects of the disclosure, where certain local osculator pulses coincide in time with the data signal pulses and the clone pulse is time offset.

FIG. 6 illustrates an example of a timing of data-carrying pulses 300 from TX 10 (at T=2 and T=12). The LO for the data-carrying pulse 224 is also provided at T=2 and T=12), e.g., in synchronization. However, in addition, a clone LO 600 is provided at a timing where there is no data-carrying pulse 300 from TX 10. In this example, the timing offset 6 is half the duty cycle of the LO for the data-carrying pulse 224 (duty cycle in this example is 10, and the clone LO is 5 away from each pulse). Thus, the intensity modulator 205 is controlled to be 2× the transmission frequency as the data-carrying pulses.

As described above, one pulse provided by the intensity modulator 205 can produce LO for the data-carrying pulse 224 and the LO for the reference pulse 222, similarly one pulse provided by the intensity modulator 205 can produce a clone LO for the data-carrying pulse and a clone LO for the reference pulse.

Figure 7:
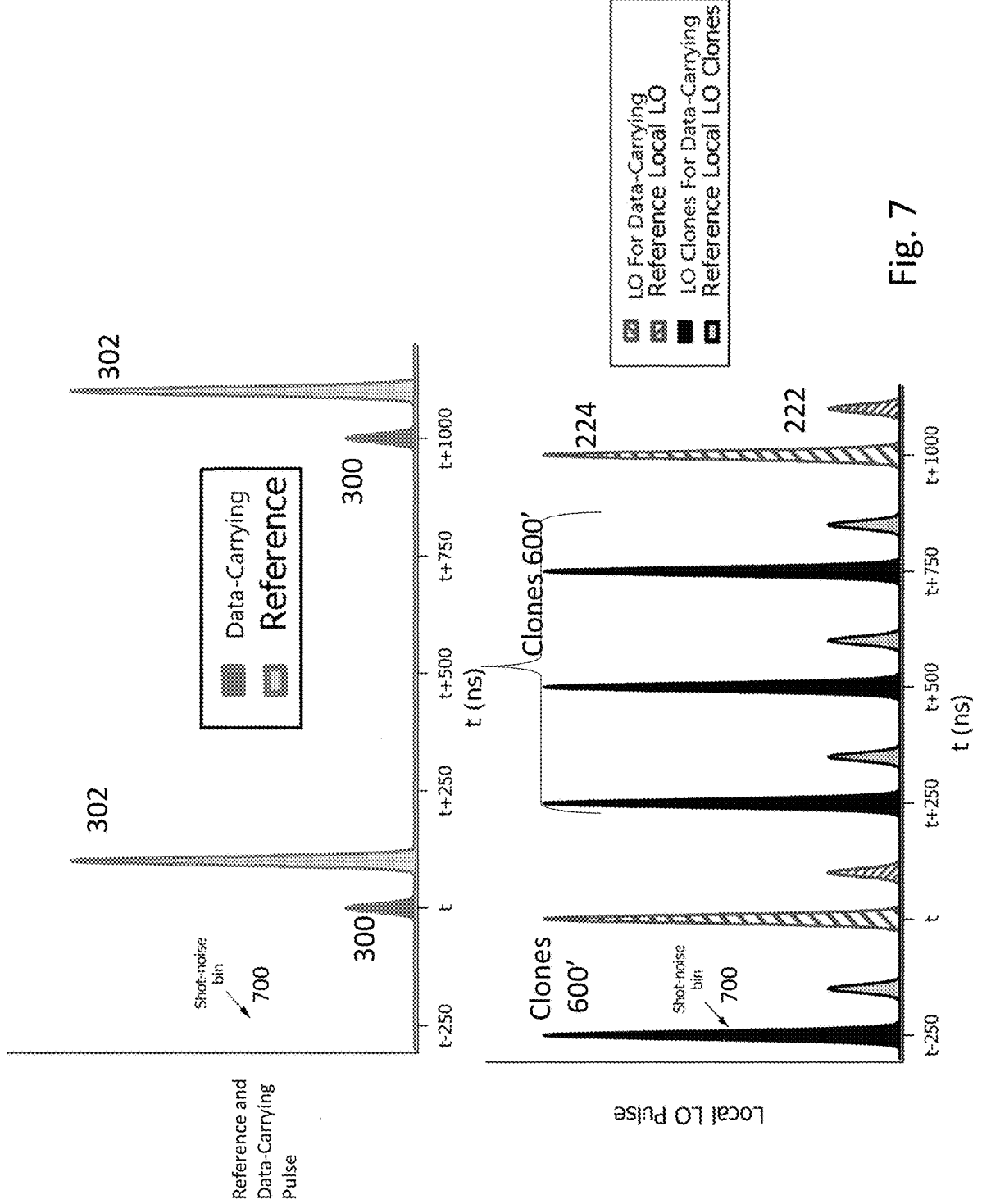
FIG. 7 illustrates another example of local oscillator pulses, certain pulses correspond to the transmitted data signal pulses, certain pulses correspond to the transmitted reference signal pulses and others are clones, where one of the clones may be used for a shot noise measurement in addition to a bias correction.

The processing circuitry 240 controls the intensity modulator 205 to provide the light pulse (which is the seed pulse) for the clone LO pulses 600, 600' symmetrically with respect to the duty cycle for the LO for the data-carrying pulse 224 and the LO for the reference pulse 222 (and since ideally the LOs are synchronized with the data-carrying pulse 300 and the reference pulse 302, symmetrically with respect to them as well). For example, when one pulse is used as the clone LO for the LO for the data-carrying pulse 224, the clone LO is timed to be half-way between consecutive LO pulses (for the data-carrying pulse 224 and the reference pulse 222). In other aspects, multiple clone LO pulses may be used (e.g., 3 per cycle). In this aspect, the clone LO pulses may be provided at 25%, 50% and 75% of the cycle such as shown in FIG. 7. In the example shown in FIG. 7, the amplitude of the clone LO for the reference pulse is less than the clone LO for the data-carrying pulse for descriptive purposed: to show that they may be different.

The RX 20 may also comprise a demultiplexer 202 to separate out the data-carrying pulses 300 and the reference pulses 302 (in the quantum communication channel 14) and the communication via the classical communication channel 12. The demultiplexer 202 may be omitted if there are different media for the different channels. If a wavelength division multiplexing (WDM) is used, the demultiplexer 202A may separate the different channels by wavelength. The demultiplexer 202A may comprises fiber splitters. One or more fiber splitters may be used to separate the classical communication channel 12 and the insecure quantum communication channel 14. The fiber splitters may be connected in series.

The received the data-carrying pulses 300 and the reference pulses 302 have an unknown polarization. In order to attempt to match the polarization, the TX 20 has a polarization control 230. The polarization control 230 comprises a plurality of actuators. For example, the actuators may be piezoelectric actuators. The polarization control 230 may also have fiber squeezers. The piezoelectric actuators may be positioned adjacent to a fiber optic cable and under the control of the polarization control 230 apply a pressure against the fiber optic cable proportional to a driving signal from the polarization control 230. The magnitude and location of the pressure controls the polarization. The polarization control 230 may be obtained from General Photonics (model PolaRite™ III). The processing circuitry 240 controls the polarization control 230. In some aspects, the control attempts to match the polarization of the reference pulse 302 with the polarization of the LO for the reference pulse 222.

Any communication received via the classical communication channel 12 is also sent to the processing circuitry 240.

After modulation by the polarization control 230, the pulses 300, 302 are received by the homodyne detection module 235. Similarly, the LO for the data-carrying pulse 224, the LO for the reference pulse 222 and the clone LOs 600 are received by the homodyne detection module 235.

Figure 3:
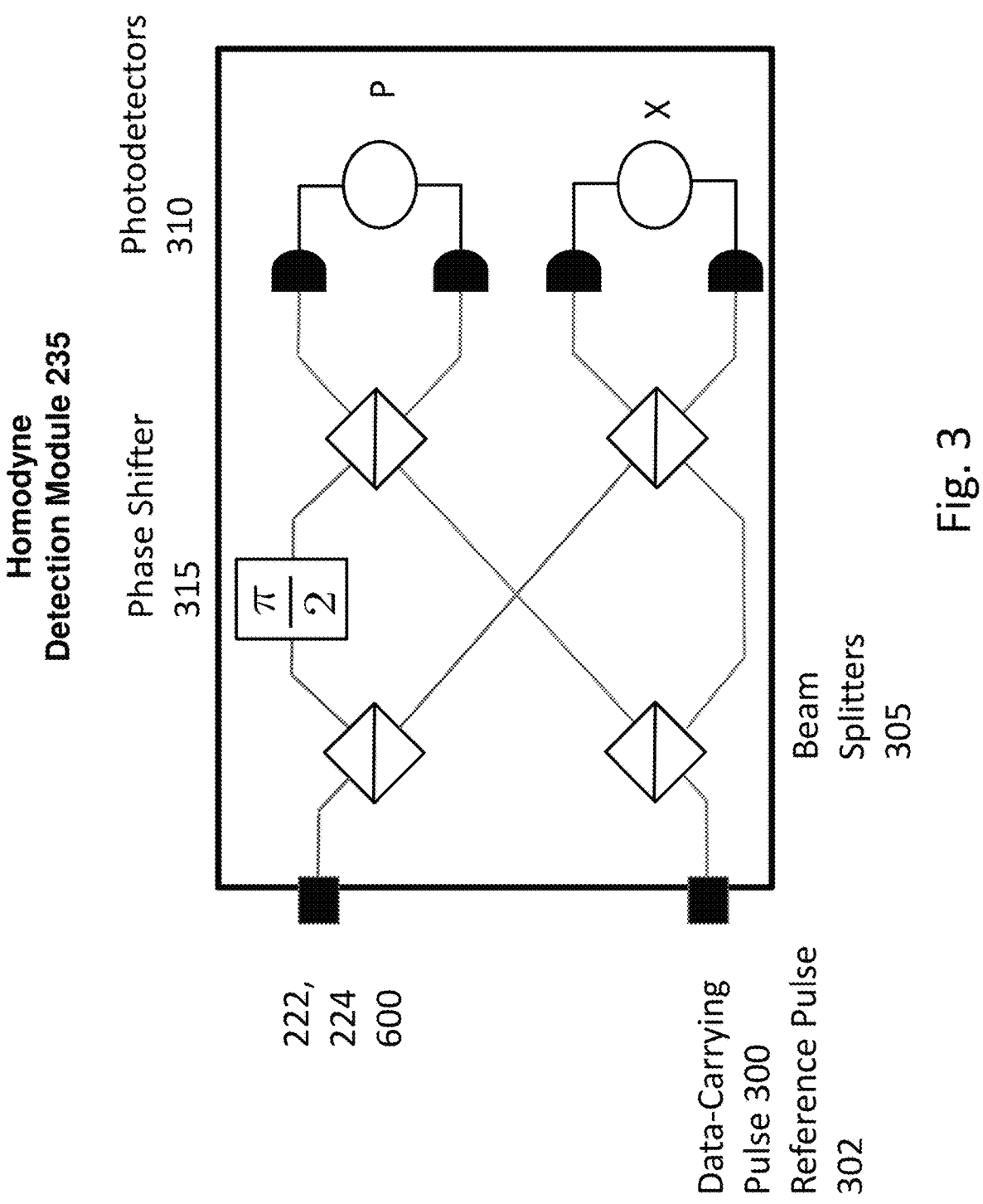
FIG. 3 illustrates an example of a homodyne detection module in accordance with aspects of the disclosure.

FIG. 3 illustrates an example of the homodyne detection module 235. The homodyne detection module 235 may comprise a pair of conjugate homodyne detectors: one for detecting P and the other for detecting X (quadrature values). Each conjugate homodyne detector as a pair of photodetectors 310. The homodyne detection module 235 also comprises beam splitters 305 to output the input pulses to the respective photodetectors 310. The homodyne detection module 235 also have a phase shifter 235 (90°).

Figure 4:
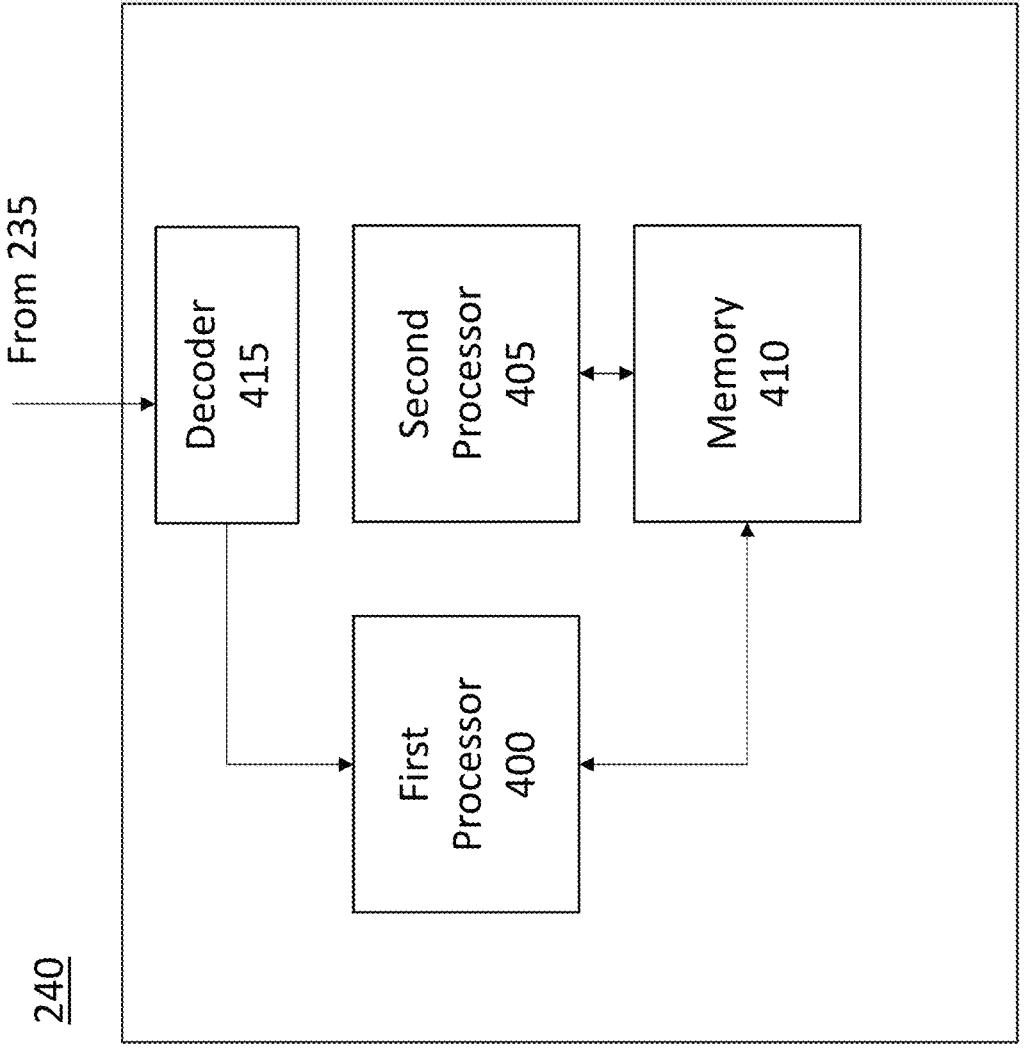
FIG. 4 illustrates an example of the processing circuitry in accordance with aspects of the disclosure.

FIG. 4 illustrates an example of the processing circuitry 240 in accordance with aspects of the disclosure. The processing circuitry 240 comprises a decoder 415, a first processor 400, a second processor 405 and memory 410. The decoder 415 may comprise an analog to digital converter (ADC). The ADC may be configured to receive the analog detection signals (e.g., quadrature values X, P) from the homodyne detection module 235 and digitize the signals for processing by the first processor 400 and in some cases, the second processor 405. The digitized signals may be of a fixed number of bits, such as 8, 12 or 16 bits.

In an aspect of the disclosure, the first processor 400 may be a field-programmable gate array (FPGA). In other aspects of the first processor 400 may be an application specific integrated circuit (ASIC). In an aspect of the disclosure, the first processor 400 is configured to calculate a Z value (measurement value) from X and P quadrature values, correct for the bias, and control the polarization control 230 and the intensity modulator 205 based on the Z value from the corrected X and P quadrature values. The first processor 400 may also detect the data carrying pulse(s) 300 and the reference pulse(s) 300 and store in the memory 410 for the second processor 405 to execute post-processing. For example, when the data-carrying pulse(s) 300 and the reference pulse(s) 300 are part of a CV-QKD packet, e.g., to distribute the quantum key, the second processor 405 processes the detected pulses. Otherwise, only the first processor 400 processes the detected pulses for synchronization and polarization correction as described herein.

In some aspect of the disclosure, the processing circuitry 240 may also have a digital-to-analog converter and amplifiers such that the first processor 400 may control the polarization control 230 and the intensity modulator 205.

The second processor 405 may be a CPU or a GPU. The CPU may execute one or more programs store in the memory 410. For example, one of the programs may include a CV-QKD protocol used to recover the quantum key sent in the data-carrying pulses 300 from TX 10 when the quantum key is distributed. The second processor 405 may also remove the bias (bias correction). However, this bias correction is slower than a bias correction using the clone LO 600 as described herein.

The memory 410 may configured to store the digitize signals quadratures X, P, the calculated measurement value Z from both the first processor 400 and the second processor 405. In an aspect of the disclosure, the first processor 400 stores in the memory 405 the raw (uncorrected) X, P values for the detected pulses (reference pulse, data carrying pulse, and clone LOs for the same). "Detected pulses" is based on the mixing of the reference pulse 302 and LO for the reference pulse 222 and the data-carrying pulse 300 mixing with the LO for the data-carrying pulse 224. Individual time bins are summed and average to detect the pulses. The summing is over the pulse width, e.g., 10 ns or 20 ns.

The first processor 400 communicates with the second processor 405 via the memory.

The RX 20 may also comprise a classical communication network interface. The second processor 405 may communicate with the TX 10 via the classical communication network interface and the classical communication channel 12. For example, the second processor 405 may request from the TX 10 for a quantum key to be distributed. In this aspect, when the request is made, the second processor 405 may inform the first processor 400 of the request via the memory 410, e.g., write a particular value in the memory 410. This causes the first processor 400 to store the values for detected pulses in the memory 410 in a preset area, e.g., shared area of the memory 410.

In other aspects, the second processor 405 may also receive digital signals from the decoder 415 (without first being detected by the first processor 400).

Figure 5:
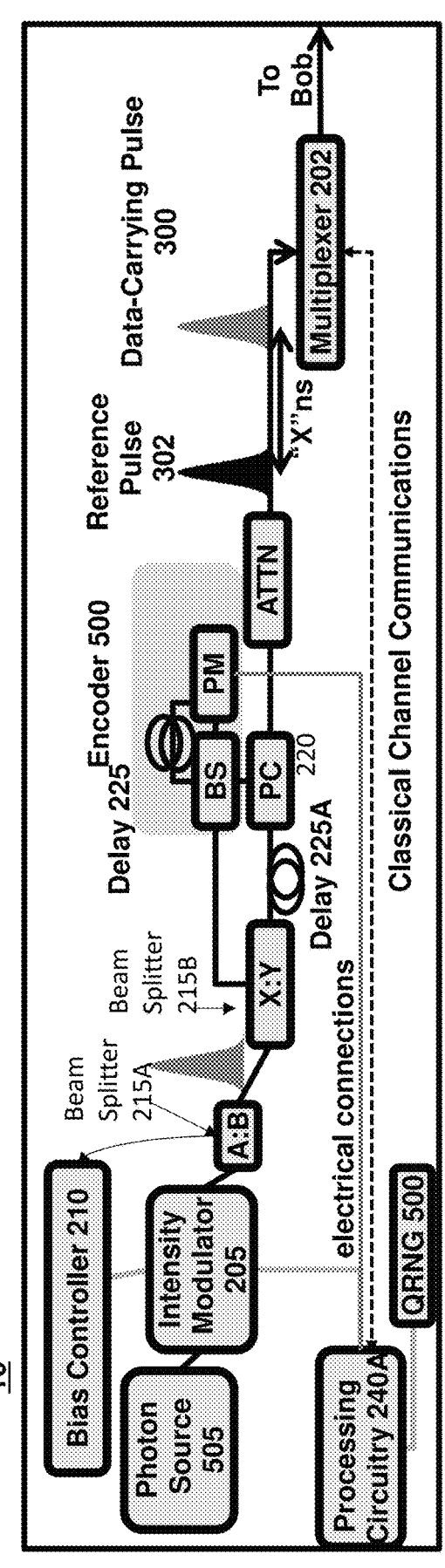
FIG. 5 illustrates an example of a transmitter in the quantum key distribution system in accordance with aspects of the disclosure.

FIG. 5 illustrates a diagram of an example TX 10 in accordance with aspects of the disclosure. The TX 20 comprises a photon source 505. The photon source 505 may be a laser. For example, the laser may be a frequency-stabilized continuous wave laser. The photon source 505 emits a light at a target wavelength. The target wavelength may be application specific. For example, the target wavelength may be about 1540 nm. In some aspects, the photon source 505 and the laser source 200 may be the same type of laser. For example, the laser may be acquired from OEwaves, Inc.

Processing circuitry 240A controls an intensity modulator 205 to provide pulses of light having a target pulse width at a target frequency. The same intensity modulator 205 described above with respect to the RX 20 may be used. The target pulse width may be application specific. For example, the target pulse width may be about 10 ns or about 20 ns in duration. For example, the target pulse width may be 12 ns in duration. In an aspect of the disclosure, the target frequency may be about 1 MHz to about 10 MHz. As discussed above, this static repetition rate is used even when a quantum key is not being distributed, e.g., regardless of whether performing CV-QKD. This continual operation allows for the polarization correction and time synchronization to be maintained in the link.

A fixed-ratio beam splitter 215A (A:B) is positioned at the output of the intensity modulator 205 to provide a feedback path for the pulses produced by the intensity modulator 205 to a bias controller 210. The feedback path assures that light is only provided by the intensity modulator 205 when desired, e.g., at a fixed pulse repetition rate (target frequency). The bias controller 210 using light feedback from the beam splitter 215A prevents light from being produced outside fixed pulse repetition rate and width by issuing a bias signal.

In some aspect of the disclosure, the A:B splitter may be a 99:1 splitter where 1% of the light is feedback into the bias controller 210, whereas 99% passes through. Preferably only a small percentage of the light is sent to the feedback path.

Each pulse of light produced by the intensity modulator 205, is used to produce the reference pulse 302 and data-carrying pulse 300. In order to separate the pulse of light produced by the intensity modulator 205 into two different paths, e.g., separate the light by polarization, the pulse of light is separated by another beam splitter 215B. The ratio of light may be set by X:Y. In an aspect of the disclosure, the ratio is set such that the magnitude of the light used for the reference pulse 302 is at least one or two orders of magnitude larger than the data-carrying pulse 300. For example, 90% of the light may be allowed to proceed in the path for the reference pulse whereas 10% may be allowed to proceed in the path for the data-carrying pulse. The two light paths downstream of the beam splitter 215B use polarization-maintaining optical fibers. This maintains pulses with an orthogonal polarization through the optical fibers.

The encoding of the data-carrying pulse 300 (such as to convey the quantum key or predefined phases between the distribution of the quantum keys) is achieved using an encoder 500. The encoder 500 may comprise a phase modulator PM and a beam splitter BS and a delay 225. The encoder 500 implements a bias-free phase-amplitude modulation. The encoder 500 can attenuate the pulse and change the phase as needed to encode the quadratures X, P with the information of the quantum key.

The PM in the encoder 500 is controlled by the processing circuitry 240A. In some aspects of the disclosure, when distributing the quantum keys, a GMCS encoding may be used. For example, each encoding for the data-carrying pulse(s) 300 may be a random Gaussian distributed value based on random bits on a random number. In an aspect of the disclosure, the random number may be generated by a quantum random number generator (QRNG) 500. The TX 10 may include the QRNG 500. In other aspects, the QRNG 500 may be an external device connected to the TX 10.

Similar to above, the processing circuitry 240A may comprise multiple processors. For example, one of the processors may be a FPGA. The FPGA may be configured to control the intensity modulator 205 and the phase modulator PM. The FPGA may control each modulator 205 (intensity) and PM (phase) via a digital to analog converter (DAC), respectively. In some aspects, an amplifier may be used to amplify the drive signal from the FPGA. The phase modulator PM may be similar to the intensity modulator 205 such as being based on a LiNbO$_3$ crystal. The phase modulator PM may be positioned asymmetrically with a Sagnac fiber loop. The loop may provide a preset delay 225. In as aspects, the delay may be about 100 ns (the total added length in the light path may be about 20 m). This is the same delay 225 as in RX 20. The position of the phase modulator PM enables different phases to be applied to a clockwise and counter-clockwise path in the loop. Adjusting the phase difference adjusts the amplitude while the sum adjusts the global phase.

The beam splitter BS in the encoder 500 once again separates the light by polarization. One light path is directed to a polarization combiner (PC) 220. The other light path may be block or re-directed.

Light pulse(s) for the reference pulse(s) 302 may be delayed, as needed to achieve a target offset or vice versa. For example, a fiber optic cable may be looped to generate another delay 225A. The delay in the light path of the reference pulse 302 allows for the data-carrying pulse 300 to be transmitted first. The reference pulse 302 has more photons than the data-carrying pulse 300. If the reference pulse 302 is transmitted first in the pair (pulse pair), there is a chance that the photons may contaminate the data-carrying pulse 300. Therefore, the reference pulse 302 is intentionally delayed with respect to its associated data-carrying pulse 300. Since there is a delay 225 in the encoder 500, the delay 225A in the reference pulse path may be twice as large. For example, in some aspects, this delay may be about 200 ns (the total added length by the loop may be about 40 m). The delayed light pulse(s) for the reference pulse(s) 302 are directed to the polarization combiner 220. To achieve the target number photons for the reference pulse 302 and the data-carrying pulse 300, the TX 10 further has an attenuator ATTN. For example, in an aspect of the disclosure, the data-carrying pulse 300 may have about 1 photon, e.g., a weak light pulse. In some aspects, the data-carrying pulse 300 may have about 10 photons. Preferably, the data-carrying pulse has less than 50 photons. In other aspects, the data-carrying pulse may have more than 50 photons such as between 50-100. However, the more photons may reduce the security of the transmission. The reference pulse 302, on the other hand, may have a larger number of photons. This is because the reference pulse 302 is used for phase correction, polarization correction and time synchronization. In an aspect of the disclosure, the reference pulse 302 may have about 1000 photons or more.

The reference pulse 302 is transmitted after its corresponding data-carrying pulse 300 (offset in time by X ns). For example, the pulses 302, 300 may be offset by 100 ns.

In an aspect of the disclosure, the processing circuitry 240A of the TX 10 may comprise a second processor. The second processor may be configured to support communication via the classical communication channel 12. The second processor in the TX 10 and interact with the second processor 405 in the RX 20. The second processor in the TX 10 may also be CPU or a GPU. The CPU may execute one or more programs store in the memory 410 including for implement a CV-QKD protocol to assisting the RX 20 to recover the quantum key sent in the data-carrying pulses 300 from TX 10 such as reconciliation. The second processor in the TX 10 may receive a request from the second processor 405 in the RX 20 for a quantum key. In response, the TX 10 generates the quantum key for distribution. Prior to distribution, e.g., immediately prior to as part of the first transmission the CV-QKD packet, the TX 10 causes a bright pulse to be emitted to the RX 20 to notify the RX 20 that a preset number of pulse pairs are going to be transmitted containing QKD information, e.g., indicate the beginning of a CV-QKD packet. For example, the processing circuitry 240A controls the intensity modulator 205 to emit a pulse having at least twice the intensity. This results in a special reference pulse and data-carrying pulse being higher intensity than the normal reference pulse 302 and data-carrying pulse 300 for synchronization and/or QKD information. At least one special reference pulse may be used to signal to the RX 20 of the start of a CV-QKD packet. This is to distinguish the bright pulses from standard reference pulses 302. A CV-QKD packet contains a preset number of pairs. For example, the packet length may be 8192. The data-carrying pulses in each pair contains one of a header, a timestamp and/or packet ID, the encoded values for the quantum key and a footer. As will be discussed later, the packet header/ footer may be used by second processor 405 in the RX 20 to determine an unknown phase offset and subsequent phase correction. In some aspects, the header and/or footer contains a known binary pattern of a certain number of bits. For example, the pattern may be 64 bits. It is known by both the TX 10 and RX 20 and may be used to sort measurements to identified "0" from "1".

The processing circuitry 240A of the TX 10 may also comprise a memory 410 to store the quantum random number and quantum key and information for transmission to RX 20.

The TX 10 may also comprise a classical communication network interface for communication via the classical communication channel 12.

Depending on the physical media used for the channel 12, 14, the TX 10 may also comprise multiplexing 202. This multiplexing may include fiber combiners to combine different wavelengths. In some aspects, the wavelength for the classical communication channel 12 may be less than the wavelength for the quantum channel 14.

The first processor 400 (e.g., FPGA) and the second processor 405 (e.g., CPU) on the RX 20 separately process the measured X, P quadrature values from the homodyne detection module 235. In an aspect of the disclosure, the first processor 400 may process each pulse measurement. However, the second processor 405 may only process detected pulses when the quantum key is being distributed.

Figure 8:
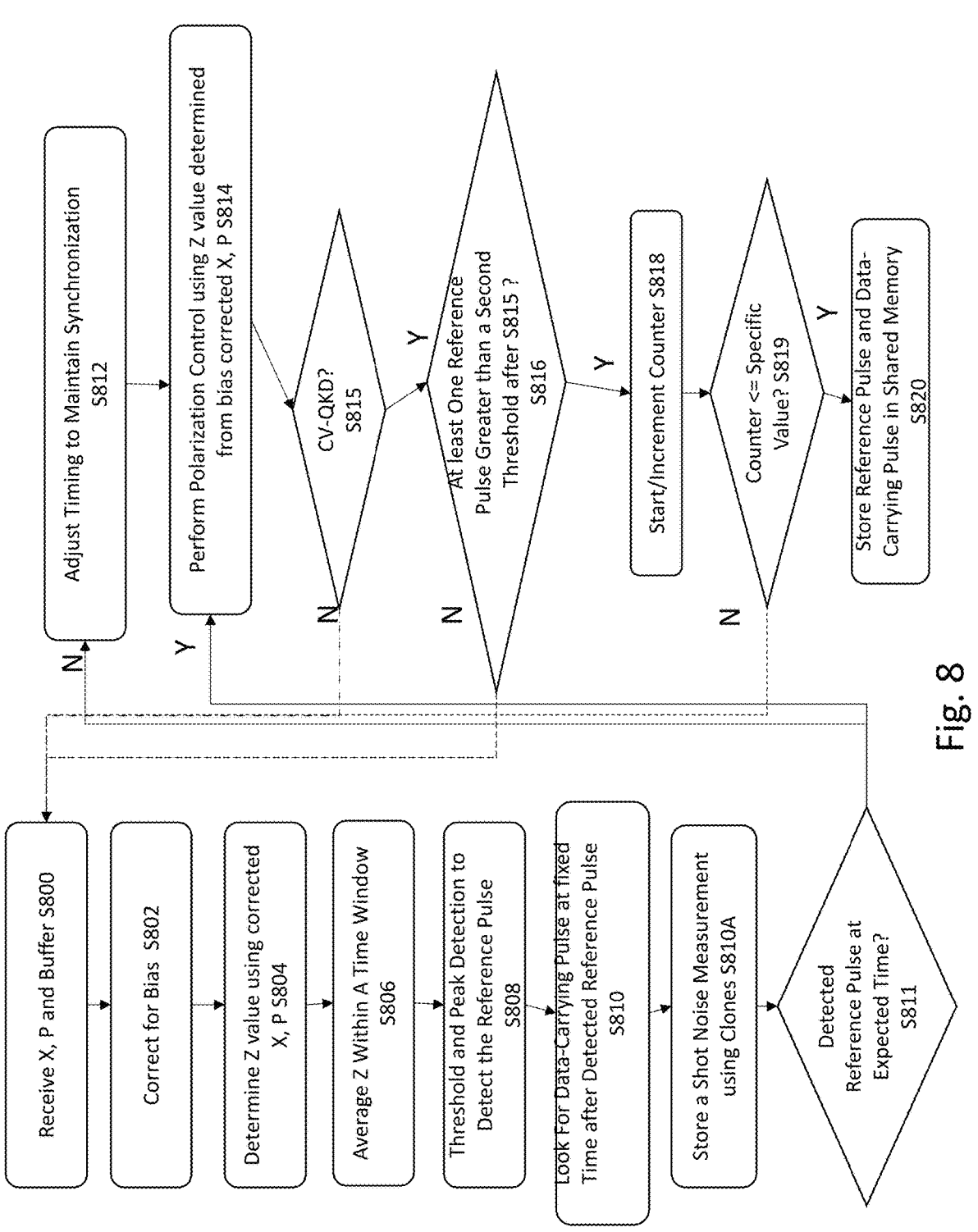
FIG. 8 illustrates a flow chart showing a control method executed by a processor in accordance with aspects of the disclosure.
Figures 9A, 9B:
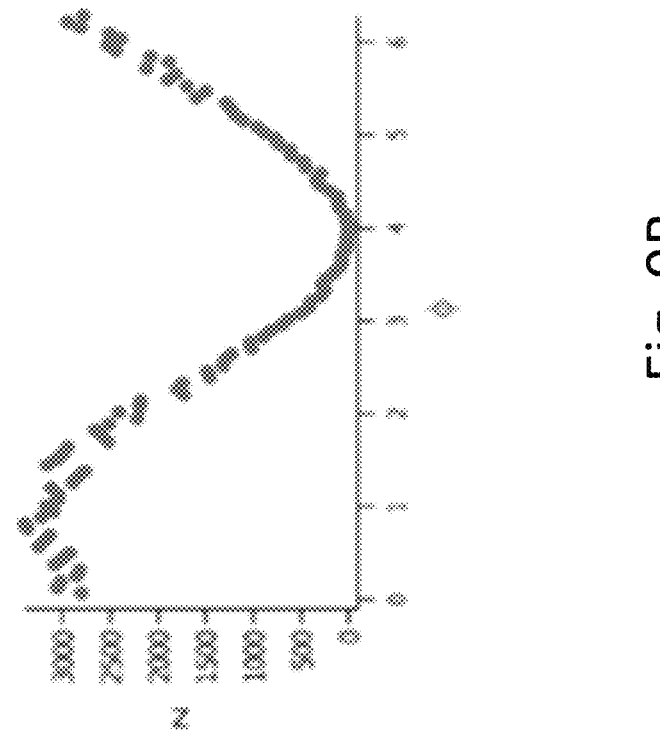
FIG. 9A illustrates an example of quadrature X and P measurements without bias correction.
FIG. 9B illustrates an example of the Z values determined from the X and P measurements in FIG. 9A.
Figures 9C, 9D:
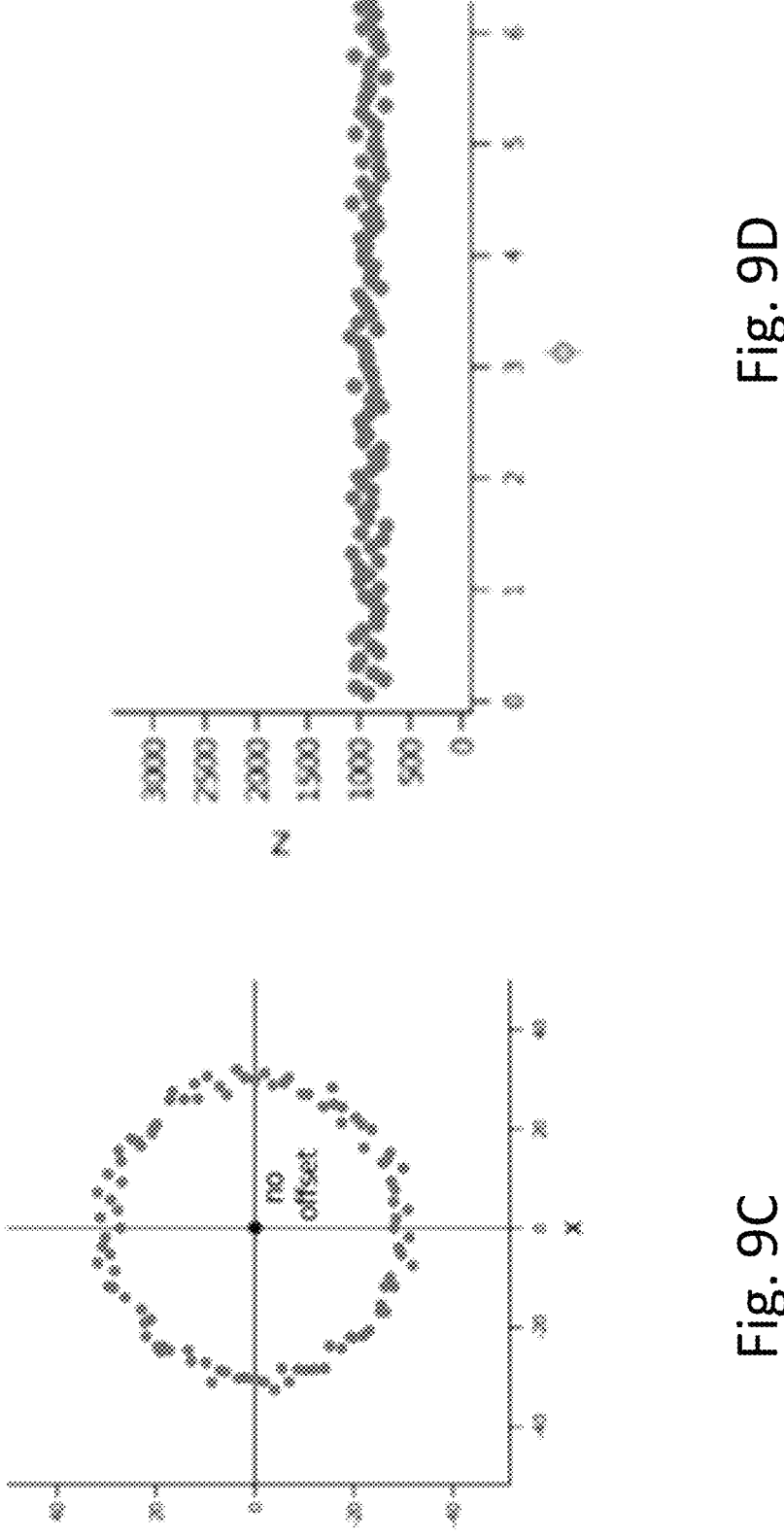
FIG. 9C illustrates an example of quadrature X and P measurements with bias correction.
FIG. 9D illustrates an example of the Z values determined from the X and P measurements in FIG. 9A.

FIG. 8 illustrates a flow showing an example method executed by the first processor 400 to process the measured X, P quadrature values from the homodyne detection module 235.

The ADC in the decoder 415 digitizes the X, P quadrature values from homodyne detection module 235. The X, P quadrature values are continuously received (in a pair). The output from the ADC is based on the resolution of the ADC. In some aspects of the disclosure, the output represents 1 ns of time. (where the repetition rate is 1 MHz of reference pulses 300). In an aspect of the disclosure, two ADC may be used, one for the X quadrature value and a second for the P quadrature value. At S800, the first processor 400 receives the digitized X, P quadrature values and buffers the same in the memory 410. Since the bias correction uses the digitized X, P quadrature values from two different times, the received values are buffered to enable the correction. In an aspect of the disclosure, the size of the buffer may be based on the repetition rate and resolution of the ADC. For example, the buffer may be sized to hold values for 1 ns bins of time such as for 1000 ns of values. The time different δ is the time between the LO for the reference pulse 222 and the clone LO for the reference pulse (or the time between the LO for the data-carrying pulse 224 and the clone LO for the data-carrying pulse). Since there is a fixed offset between LO for the reference pulse 222 and the data-carrying pulse 224.

The digitized X, P quadrature values are corrected by taken the difference between the two different time measurement at S802. For example, the first processor 400 determines the corrected X and P quadrature values as follows.

$$X_{corrected}(t) = X_{meas}(t) - X_{meas}(t - \delta) \approx X(t)$$

$$P_{corrected}(t) = P_{meas}(t) - P_{meas}(t - \delta) \approx P(t)$$

Where t is a current time of the measurement and t−δ is an earlier measurement. The correction is done on each time series measurement received from the homodyne detection module 235 via the digitizer. This allows for the corrected X, P quadrature values to approximate the real-pulse values for the measurements. For example, where the fixed pulse repetition rate for the TX 10 is 1 MHz, reference pulses 302 and data-carry pulses 300 are transmitted every 1000 ns. The clone LOs may a produced 500 ns after each original LO for the respective LOs. In this case, δ is 500. Thus, at T=500, the two measurement times for correction is T=500 and T=0. The measurements are continuously corrected for different time bins. For example, at T=600, the two measurement times for the correction is T=600 and T=100.

At S804, the first processor 400 determines a Z value from the corrected X and P quadrature values. For example, the first processor 400 determines Z as follows:

$$Z(t) = X^2_{corrected}(t) + P^2_{corrected}(t).$$

As described above, each pulse from TX 10 has a specified pulse width. Therefore, in order to detect a pulse from the TX 10, Z values from adjacent time bins may be averaged at S806. The number of adjacent time bins (time interval) included in the average may be based on the resolution of the ADC and the pulse width. For example, if the pulse width is 10 ns and each time bin is 1 ns, then 10 Z values are averaged. For example, the $Z_{ave}$ value for T=0, includes the Z values from T=0, 1, 2, 3, 4, 5, 6, 7, 8, 9 (where the Z value are the corrected Z values from S804). Similarly, $Z_{ave}$ value for T=1, includes the Z values from T=1, 2, 3, 4, 5, 6, 7, 8, 9, 10 (where the Z value are the corrected Z values from S804). The averaging is performed for each time bin.

At S808, the first processor 400 determines whether a reference pulse 302 from TX 10 has been detected. For example, the first processor 400 compares the $Z_{ave}$ determined in S806 with a threshold value. The first processor 400 identifies the time bin associated with the first cross above this threshold as first time. Once the first processor 400 identifies the first time, the processor 400 looks for a peak $Z_{ave}$ with a set time window away from the first time. The time bin associated with the peak $Z_{ave}$ is defined as the time of the reference pulse (e.g., the detection time of the reference pulse). The $Z_{ave}$ may be stored in a specific position in the memory 410 (along with the raw X and P values and corrected values). Since it is known that the data-carrying pulse 300 is offset in time by the fixed time amount, the processor 400 identifies as the data-carrying pulse 300, the Z value (and its raw X and P values and the $Z_{ave}$) for the measurement associated with the time bin at the fixed offset. For example, if the reference pulse 302 is identified as being at T=0 and there is a 100 ns time offset, the first processor 400 looks for the data-carrying pulse at T=100 ns. The $Z_{ave}$ may be stored in a specific position in the memory 410 (along with the raw X and P values and corrected values) for the detected data-carry pulse.

Each measurement Z(t), where 1≤i≤N, is proportional to the photon number per $i^{th}$ reception from among the N receptions by the RX 20 as detected by the homodyne detection module 235.

The photon number arriving at the heterodyne detector is n=²$n_{det}$/η where η is the detector efficiency. $n_{det}$ is based on a Z contribution from pulses from TX 10, from shot-noise and contribution from all electric sources when no light is incident into the detector.

$$n_{det}=(Z-Z_{shot}-Z_{elec})/Z_{shot}, \text{ where } Z \text{ is calculated above.}$$

Advantageously, the production of a clone LO 600 (or multiple clone LO 600' enables a real-time shot noise measurement since it intentionally is produced in a time where there is no data-carrying pulse 300 or reference pulse 302 at S806. In CV-QKD, shot-noise measurement is critical since it impacts metrics for secret key rates. Shot noise impacts both the photon count and the phase as the phase is a function of a ratio of P and X. An incorrect measurement of the shot-noise could lead to an erroneous calculation of the photon number and an erroneous level of security.

Shot-noise is solely present when there is only vacuum in the signal port of homodyne detection module 235 with a LO pulse in the other port (e.g., no data-carrying pulse 300 or reference pulse 302), but a pulse from the LO. Due to dynamic system parameters such as fluctuations in power from the pulses such as from the pulses 222, 224 or clone LO 600, it is necessary that the shot-noise be determined at high-frequency, preferably in real-time. For example, as shown in FIG. 7, the shot-noise measurement time bin 700 may be at t+250. In FIG. 7, there are three pairs of clone LOs 600'. Any one of the pairs may be used for the shot-noise measurement. In FIG. 7, t+250 was chosen because it is furthest away from the subsequent data-carrying pulse 300 and the reference pulse 302. At S810A, the first processor 400 records the raw X and P values in a specific location in the memory 410.

The temporal separation along with orthogonal reference pulse 302 and data-carrying pulse 300 polarizations ensure that no photons from the reference pulse 302 contaminate the shot-noise measurement.

In an aspect of the disclosure, TX 20 may also comprise an optical switch connected to the reference/signal port of the homodyne detection module 235 which may selectively block light (photons) during the shot-noise measurement. The blocking of the light during the shot-noise measurement assures that no light may enter the port such as by an adversary injecting light (while the shot-noise measurement is being performed).

At S811, the first processor 400 determines if the timing to control the intensity modulator 205 needs to be adjusted based detection time of the reference pulse 302 at S808 or based on changes in average Z. In an aspect of the disclosure, reference pulses 302 are expected to be periodic being on the repetition rate. For example, if the repetition rate is 1 MHZ, it is expected that the reference pulse 302 is received at RX 20 every 1000 ns. Thus, if a reference pulse is received at T=1000 ns and another reference pulse is expected at T=2000 ns. However, if it is determined at S808, that the reference pulse 302 is received at T=2000 ns, it is likely due to a time synchronization failure. Therefore, if there is a time difference between the expected time of available of the reference pulse and the determined time, the first processor 400 adjusts the timing of the reference LO to maintain synchronization at S812.

In other aspects, it is noted that if the reference pulse 302 and the LO for the reference pulse 222 is perfectly aligned, it would be expected that the Z value would be maximized with a relatively stable value every 1000 ns. However, when the reference pulse 302 and the LO for the reference pulse 222 are not synchronized, the reference pulse 302 may not be "seen" and detected and the Z value changes, e.g., decreases at the expected time of arrival of the reference pulse 302. When there is a change in the Z value from an expected Z value at the expected time of arrival (such as a change greater than a threshold), the first processor 400 determines that the LO for the reference pulse 222 is out of synchronization with the reference pulse 302 and changes the timing for the LO for the reference pulse 222 by a preset time step. For example, the first processor 400 may delay the control of the intensity modulator 205 to output its pulse of light by the preset time step. For example, the preset time step may be 1 ns. This process may be repeated until the LO for the reference pulse 222 returns to be synchronized with the reference pulse 302. While the RX 20 may change the timing by 1 ns increment, the TX 10 maintains a fixed repetition rate.

In an aspect of the disclosure, if the RX 20 loses a "lock" on the reference pulse 302 e.g., missing the reference pulse 302, the first processor 400 maintains the generation of the LO for the reference pulse 222 at the repetition rate, such as 1 MHz until another reference pulse 302 is detected and relocks on the reference pulse 302.

In an aspect of the disclosure, when the first processor 400 controls the intensity modulator 205 with a delay, e.g., 1 ns, this in turn delays both the LO for the reference pulse 222 and LO for the data-carrying pulse 224 by the same amount since there is a fixed time offset between the two.

Additionally, in order to maintain the same time difference the LO for the reference pulse 222 and its clone LO and the LO for the data-carrying pulse 224 and its clone LO, the first processor 400 also delays the control of the intensity modulator 205 to produce the seed pulse for the clone LOs as well (both for the reference pulse and the data-carrying pulse). Once again, a delay in one, e.g., clone for the reference pulse causes the same delay for the other, e.g., clone LO for the data-carrying pulse.

If there is no need to adjust the timing, S812 may be skipped and the first processor may perform polarization correction, as needed at S814. At S814, the first processor 400 may perform a polarization correction using the $Z_{ave}$ values calculated at S806 for the time bins of the reference pulse(s) 302 identified at S808. When the polarization of the reference pulse 300 from TX 10 matches the polarization of LO for the reference pulse 222, the $Z_{ave}$ values are maximized. Thus, the Z value itself provides a metric to correct the polarization of the incoming reference pulse 302 and the data-carrying pulse 300. In an aspect of the disclosure, the first processor 400 averages a predetermined number of determined $Z_{ave}$ values for reference pulses. for example, the predetermined number may be 1000. With a goal to increase the average over the $Z_{ave}$ for the reference pulses, the first processor 400 controls the actuators in the polarization control 230 to move either by increasing or decreasing an applied voltage in a preset step size. After each step, the first processor 400 monitors the change in the average of the predetermined number of $Z_{ave}$ values (using new $Z_{ave}$ after the change). If the average increased, the first processor 400 may continue to change the applied voltage in the same direction and repeat until the average $Z_{ave}$ stays the same or decreases. If the average $Z_{ave}$ decreases, the first processor 400 changes the applied voltage in the opposite direction. For example, if in the first step, the voltage was increased and the average decreased, in the second step, the voltage will be decrease. Each increase or decrease may be in the same fixed interval.

Of note, there may be a change in relative polarization between the reference pulse 302 and the LO for the reference pulse 222 due to a temperature dependent change. The polarization correction described herein counteracts the relative change. In an aspect of the disclosure, to double-check that the polarization correction is working properly, and the correction is for the correct reference pulse and data-carrying pulse, the first processor 400 may maintain a count of reference pulses 302 detected in S808 for a predetermined period of time. The count may be compared to an expected number of reference pulses for the predetermined period of time. If the change in polarization does not bring the count of reference pulses 302 closer to or equal to the correct values, the first processor 400 may reverse the change in the polarization from prior change, e.g., last change. This may be particularly useful where the system is first turned on and the synchronization is not fully locked or where the lock is synchronization is missed for multiple cycles.

The polarization control, e.g., motion of the actuators to insert pressure may cause additional noise in the measurements. Therefore, in some aspects of the disclosure, S814 may be omitted during pulse transmission which is part of a CV-QKD packet (e.g., after the special reference pulse is received signaling the start of a CV-QKD packet. In this aspect, once all pairs of pulses are received from the CV-QKD packet, S814 may be performed again.

The use of the clone LO 600 may cause additional noise to be added to the X, P quadrature values (as corrected) since the correction used to LOs from different time and thus may double the shot-noise. Therefore, in accordance with aspects of the disclosure, the second processor 405 may calculate the Z or $Z_{ave}$ from the uncorrected X and P values and correct for the bias in a post-processing to recover the distributed quantum key.

In an aspect of the disclosure, the second processor 405 may communicate with the first processor 400 via the memory 410 to inform the first processor 400 that a quantum key has been requested and to expect a special reference pulse. For example, the second processor 405 may write a specific value in a register of the memory 410.

At S815, the first processor 400 checks to see whether it received information that a CV-QKD packet is expected, e.g., checks to see if the specific value is recorded. In response to being informed ("Y" a S815), the first processor 400 determines if a special reference pulse has been received (after S815) at S816. For example, the first processor 400 may compare the peak $Z_{ave}$ determined in S808 with a second threshold. If the peak $Z_{ave}$ determined in S808 is greater than the second threshold, the first processor 400 deems the reference pulse detected at S808 as the special reference pulse at S816 ("Y at S816). Otherwise, the reference pulse detected at S808 is a standard reference pulse.

At S818, the first processor 400 starts a counter for counting the pulse pairs (data-carrying pulses and reference pulses in the CV-QKD packet). The counter is used to determine whether the first processor 400 stores data related to the detected reference pulses 302 in S808 in a shared storage location of the memory 410 for post processing or maintain in the current location for rewriting. Since the second processor 405 may only process pulse pairs associated with the CV-QKD packet, the second processor 405 only needs access to data associated with the packet and not data between any CV-QKD packet. Each time a pulse pair in the CV-QKD packet is detected by the first processor 400 (S808, S810) and the data is stored in the shared memory in memory 410 (S810), the counter may be incremented at S818.

Once the counter reaches a specific value (which is equal to the number of pulse pairs in the CV-QKD packet), the first processor 400 stops storing the data in the shared memory ("N" at S819). The first processor 400 may only store the data in the shared memory (S820) when the counter is less than or equal to the specific value ("Y" at S819).

Although S815/S816 are shown in FIG. 8 in a sequence of functions, S815/S816 may occur in parallel with other functions. For example, in parallel with the detection in S808, the first processor 815 may determine whether the pulse is expected for a CV-QKD packet (S815) and whether the reference pulse is a special reference pulse (S816).

Additionally, the TX 10 may send one or more special reference pulses. Thus, once one of the reference pulses is deemed a special reference pulse at S816 ("Y" at S816) any subsequent received pulse pair from the same CV-QKD packet still would lead to a "Y" determination at S816 (as at least one reference pulse is or was a special reference pulse).

When S815/S816 are executed in parallel, the data for the detected reference pulses and data-carrying pulse may only be stored in the shared memory of the memory 410 instead of both a specific area accessible by only the first processor and the shared memory.

In an aspect of the disclosure, the second processor 405 may correct the raw X and P quadrature values stored in the shared memory for bias (for both the detected reference pulse and data-carrying pulse by the first processor 400) for each pulse pair. The correction for bias executed by the second processor 405 may use one or more known correction methods (without using the clone correction).

Once the X, P quadrature values are bias corrected, the second processor may determine the phase offset and phase corrections. The phase offset may be determined using the known pattern transmitted in the header or footer of the CV-QKD packet to rotate the "0" and "1" clusters. There is a constant phase offset between the reference pulse 302 and the data-carrying pulse 300 from TX 10. The determined constant phase offset may be subsequently used to recover the phase of the data-carrying pulses (which are encoded). In the aspect of the disclosure, the second processor 405 may determine a phase difference between the reference pulse 302 and the LO for the reference pulse 222, which may change over time. The phase difference is a function of X and P ($-\arctan (P/X)$) and perform a phase correct to determine the phase of the data-carrying pulse 302 accounting for the phase offset. Phase correction is needed because the TX 10 and RX 20 have different light sources.

In an aspect of the disclosure, the second processor 405 also retrieves the shot noise measurements stored in the shared memory at S810A and corrects the phase and calculated $Z_{ave}$ to account for the shot noise.

A raw rough quantum key may be determined from the post phase corrected and bias corrected X, P values for the data-carrying pulses and calculated $Z_{ave}$. However, to obtain less "noisy" quantum key, the second processor 405 executes reconciliation with the second processor in TX 10 via the classical communication channel 12 using a CV-QKD protocol.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof.

A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The processor(s) described herein, e.g., a hardware processor, may be other suitable processing component or device, or one or more combinations thereof. The memory(s) may include random access memory (RAM), read-only memory (ROM) or another memory device, and may store data and/or processor instructions for implementing various functionalities associated with the methods and/or systems described herein.

In the description and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of +1% or +10%, or any point therein. For example, the term about when used for a measurement in mm, may include +/-0.1, 0.2, 0.3, etc., where the difference between the stated number may be larger when the state number is larger. For example, about 1.5 may include 1.2-1.8, where about 20, may include 19.0-21.0.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A receiver comprising:
a local oscillator (LO) configured to produce pulses comprising
a train of primary pulses synchronized to a train of reference pulses transmitted by a transmitter over a quantum communication channel, and
a train of secondary pulses, each secondary pulse being a clone LO pulse, wherein each primary pulse corresponds to one or more clone LO pulses from the train of secondary pulses, where the one or more clone LO pulses are timed to split a duty cycle of the train of primary pulses in an even number of equal time intervals;

a homodyne detector configured to
receive the reference pulses from the transmitter over the quantum communication channel,
mix each reference pulse with a corresponding primary pulse, and
output measurement signals comprising (i) reference measurements acquired with the primary pulses mixed with the references pulses, respectively and (ii) bias measurements acquired with respective one or more clone LO pulses for a primary pulse; and
processing circuitry configured to remove bias from the reference measurements by subtracting from the reference measurements corresponding bias measurements.

2. The receiver of claim 1, wherein the one or more clone LO pulses is a single clone LO pulse timed to split the duty cycle of the train of primary pulses in halves.

3. The receiver of claim 1, wherein the produced pulses further comprise a train of tertiary pulses synchronized to a train of data-carrying pulses transmitted by the transmitter over the quantum communication channel, and
a train of quaternary pulses, each quaternary pulse being a clone LO pulse, wherein each tertiary pulse corresponds to one or more clone LO pulses from the train of quaternary pulses, where the one or more clone LO pulses from the train of quaternary are timed to split the duty cycle of the train of tertiary pulses in an even number of equal time intervals,
wherein the homodyne detector is configured to further receive the data-carrying pulses transmitted by the transmitter over the quantum communication channel, mix the data-carrying pulses with the tertiary pulses, respectively, and
output measurement signals comprising (i) data-carrying measurements acquired with the tertiary pulses mixed with the data-carrying pulses, and (ii) bias measurements acquired with respective one or more clone LO pulses for a tertiary pulse, and wherein the processing circuitry configured to remove bias from the data-carrying measurements by subtracting from data-carrying measurements the corresponding bias measurements.

4. The receiver of claim 3, wherein the one or more clone LO pulses from the train of quaternary pulses is a single clone LO pulse timed to split the duty cycle of the train of tertiary pulses in halves.

5. The receiver of claim 3, wherein there is a fixed delay between a clone LO pulse from the train of secondary pulses and associated clone LO pulse from the train of quaternary pulses and there is the fixed delay between a pulse in the train of primary pulses and associated pulse in the train of tertiary pulses.

6. The receiver of claim 5, wherein the processing circuitry is configured to determine a timing of receiving the train of references pulses transmitted by the transmitter over the quantum communication channel and adjust the timing of the train of primary pulses to maintain synchronization, wherein in response to adjusting the timing of the train of primary pulses, the processing circuitry further adjusts the timing of the train of the secondary pulses to maintain the time split of the duty cycle of the train of primary pulses for the train of the secondary pulses.

7. The receiver of claim 6, wherein the adjusting of the timing of the train of secondary pulses also adjusts the timing of the train of quaternary pulses and wherein the processing circuitry further adjusts the timing of the train of tertiary pulses to maintain synchronization based on the determination of the timing of receiving the train of reference pulses.

8. The receiver of claim 3, further comprising a polarization controller, wherein the processing circuitry is configured to correct a polarization of the train of reference pulses and the train of data-carrying pulses transmitted by the transmitter over the quantum communication channel using the bias removed reference measurements.

9. The receiver of claim 3, wherein the LO comprises:

a continuous-wave light source;

an intensity modulator in optical communication with the continuous-wave light source, wherein the processing circuitry controls the intensity modulator to produce pulses of light from the continuous-wave light source at a target repetition timing;

a beam splitter configured to separate the pulses of light from the intensity modulator into a first light path and a second light path; and a delay configured to provide a fixed delay between light emitted from the first light path with respect to the light emitted from the second light path.

10. The receiver of claim 9, wherein the first light path produces the train of primary pulses and the train of secondary pulses.

11. The receiver of claim 3, wherein the processing circuitry is configured to execute real-time shot noise measurement using a clone LO pulse per each duty cycle.

12. The receiver of claim 11, wherein the processing circuitry is configured to determine a number of photons in each data-carrying pulse based on the real-time shot noise measurement and a bias corrected data-carrying measurement corresponding to the data-carrying pulse.

13. The receiver of claim 3, wherein each of the received data-carrying pulses comprises a maximum number of photons in a range of 10-100 and wherein the train of primary pulses is at least an order of magnitude larger.

14. The receiver of claim 3, wherein each of the received data-carrying pulses comprises fewer than 10 photons.

15. The receiver of claim 9, wherein the processing circuitry comprises a field programmable gate array (FPGA), wherein the FPGA controls the intensity modulator and a polarization control.

16. The receiver of claim 9, wherein the continuous-wave light source in the receiver is different from a light source used to produce the data-carrying pulses and the reference pulses from the transmitter.

17. A continuous variable (CV) quantum key distribution (QKD) system comprising:

a quantum communication channel;

a transmitter (TX) configured to encode a data signal onto the train of data-carrying pulses, and transmit the train of data-carrying pulses and the train of reference pulses over the quantum communication channel; and the receiver (RX) according to claim 3, wherein the receiver is configured to receive the train of data-carrying pulses and the train of reference pulses transmitted over the quantum communication channel, and recover the data signal using the train of data-carrying pulses without bias correction via any clone LO pulses in conjunction with a sequence of communications the TX over a classical communication channel in accordance with a Continuous Variable Quantum Key Distribution (CV-QKD) protocol.

18. The system of claim 17, wherein the quantum communication channel and the classical communication channel are formed in the same fiber cable.

19. The system of claim 17, wherein the TX comprises a bias-free phase-amplitude modulator.

* * * * *